(12) United States Patent
Daandels et al.

(10) Patent No.: US 11,541,991 B2
(45) Date of Patent: Jan. 3, 2023

(54) AIRCRAFT STRUCTURE FOR FLOW CONTROL

(71) Applicant: Airbus Operations GmbH, Hamburg (DE)

(72) Inventors: Dort Daandels, Hamburg (DE); Bernhard Schlipf, Hamburg (DE); Christian Heck, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 114 days.

(21) Appl. No.: 16/799,946

(22) Filed: Feb. 25, 2020

(65) Prior Publication Data

US 2020/0290730 A1 Sep. 17, 2020

(30) Foreign Application Priority Data

Feb. 28, 2019 (DE) ...................... 10 2019 105 166.5

(51) Int. Cl.
*B64C 21/06* (2006.01)
*B64C 3/26* (2006.01)
*B64C 1/00* (2006.01)
*B64F 5/40* (2017.01)

(52) U.S. Cl.
CPC ............... *B64C 21/06* (2013.01); *B64C 3/26* (2013.01); *B64F 5/40* (2017.01); *B64C 2001/0072* (2013.01); *B64C 2230/22* (2013.01)

(58) Field of Classification Search
CPC ..... B64C 21/04; B64C 21/06; B64C 2230/22; B64C 1/064; B64C 3/182; B64C 3/26; B64C 2001/0072; B64F 5/40
See application file for complete search history.

(56) References Cited

U.S. PATENT DOCUMENTS

| 2,742,247 | A | * | 4/1956 | Lachmann | .............. B64C 21/06 244/119 |
| 4,828,206 | A | * | 5/1989 | Bruno | ...................... B64C 3/34 244/132 |
| 5,688,426 | A | * | 11/1997 | Kirkwood | ........... B29C 66/7392 219/633 |

(Continued)

FOREIGN PATENT DOCUMENTS

| DE | 36 35 270 | 4/1987 |
| DE | 10 2010 014 640 | 10/2011 |

(Continued)

OTHER PUBLICATIONS

Search Report for DE Application No. 10 2019 105 166.5 dated Nov. 6, 2019, 7 pages.

(Continued)

*Primary Examiner* — Joshua J Michener
*Assistant Examiner* — Ryan Andrew Yankey
(74) *Attorney, Agent, or Firm* — Nixon & Vanderhye P.C.

(57) ABSTRACT

An aircraft structure (11) for flow control including a perforated panel (13) having an inner surface (15) directed to a structure interior (17), an outer surface (19) in contact with an ambient flow (21), and a plurality of micro pores (23) connecting the inner and outer surfaces (15, 19). Elongate crack stopper elements (25) are attached to the inner surface (15) of the perforated panel (13). The crack stopper elements (25) are configured to inhibit crack propagation within the perforated panel (13).

17 Claims, 9 Drawing Sheets

(56) References Cited

U.S. PATENT DOCUMENTS

| | | | | |
|---|---|---|---|---|
| 5,899,416 | A * | 5/1999 | Meister | B64C 21/06 244/207 |
| 7,753,312 | B2 * | 7/2010 | Schmidt | B32B 3/14 244/119 |
| 7,798,285 | B2 * | 9/2010 | Chiou | F02C 7/045 181/213 |
| 7,866,609 | B2 | 1/2011 | Parikh | |
| 8,128,037 | B2 | 3/2012 | Powell et al. | |
| 10,683,084 | B2 * | 6/2020 | Gueuning | B64C 21/08 |
| 11,396,366 | B2 * | 7/2022 | Sanz Martinez | B64D 29/00 |

FOREIGN PATENT DOCUMENTS

| | | | | |
|---|---|---|---|---|
| DE | 102010014640 | A1 * | 10/2011 | B64C 3/26 |
| EP | 3 205 575 | | 8/2017 | |
| FR | 1 378 525 | | 11/1964 | |
| FR | 1 450 250 | | 5/1966 | |
| GB | 2 442 112 | | 3/2008 | |
| WO | 2007/145512 | | 12/2007 | |

OTHER PUBLICATIONS

Boeing Commercial Airplane Group, "High Reynolds Number Hybrid Laminar Flow Control (HLFC) Flight Experiment: IV. Suction System Design and Manufacture" NASA/CR-199-209326, Sec. 5.4 and (Apr. 1999), 110 pages.
Boeing Commercial Airplane Group, "High Reynolds Number Hybrid Laminar Flow Control (HLFC) Flight Experiment II: Aerodynamic Design," NASA/CR 1999-209324 (Apr. 1999), 170 pages.
Henke "A 320 HLF Fin Flight Tests Completed", Air & Space Europe, vol. 1., No. 2 (1999), 4 pages.
Joslin, "Aircraft Laminar Flow Control" Annual Review of Fluid Mechanics, vol. 30, pp. 1-29 (1998).
NASA Albert Braslow, "A History of Suction-Type Laminar Flow Control with Emphasis on Flight Research" (Feb. 1999), 84 pages.
Schrauf, "Simplified Hybrid Laminar Flow Control" ECCOMAS 2004, 13 pages.
Schrauf, "Status and Perspectives of Laminar Flow" The Aeronautical Journal, vol. 109, pp. 639-644 (Dec. 2005).
Wong, "Studies of Methods and Philosophies for Designing Hybrid Laminar Flow Wings" ICAS 2000 Congress (Aug. 2000), 11 pages.
Wong, "Drag Reduction Using Boundary Layer Suction and Blowing" presented at the CEAS/KATnet Conference on Key Aerodynamic Technologies (Jun. 20-22, 2005), 8 pages.
Wong "Flow Control Studies for Military Aircraft Applications," American Institute of Aeronautics and Astronautics (Jul. 2004), 11 pages.
Wagner, "Laminar Flow Control Leading Edge Systems in Simulated Airline Service," 16th Congress International Council of Aeronautical Sciences (Sep. 1988), 11 pages.
Schmitt, "Hybrid Laminar Fin Investigations," RTO MP-051 (May 2000), 11 pages.
European Search Report cited in EP 20153868.3 dated Jul. 21, 2020, 6 pages.

\* cited by examiner

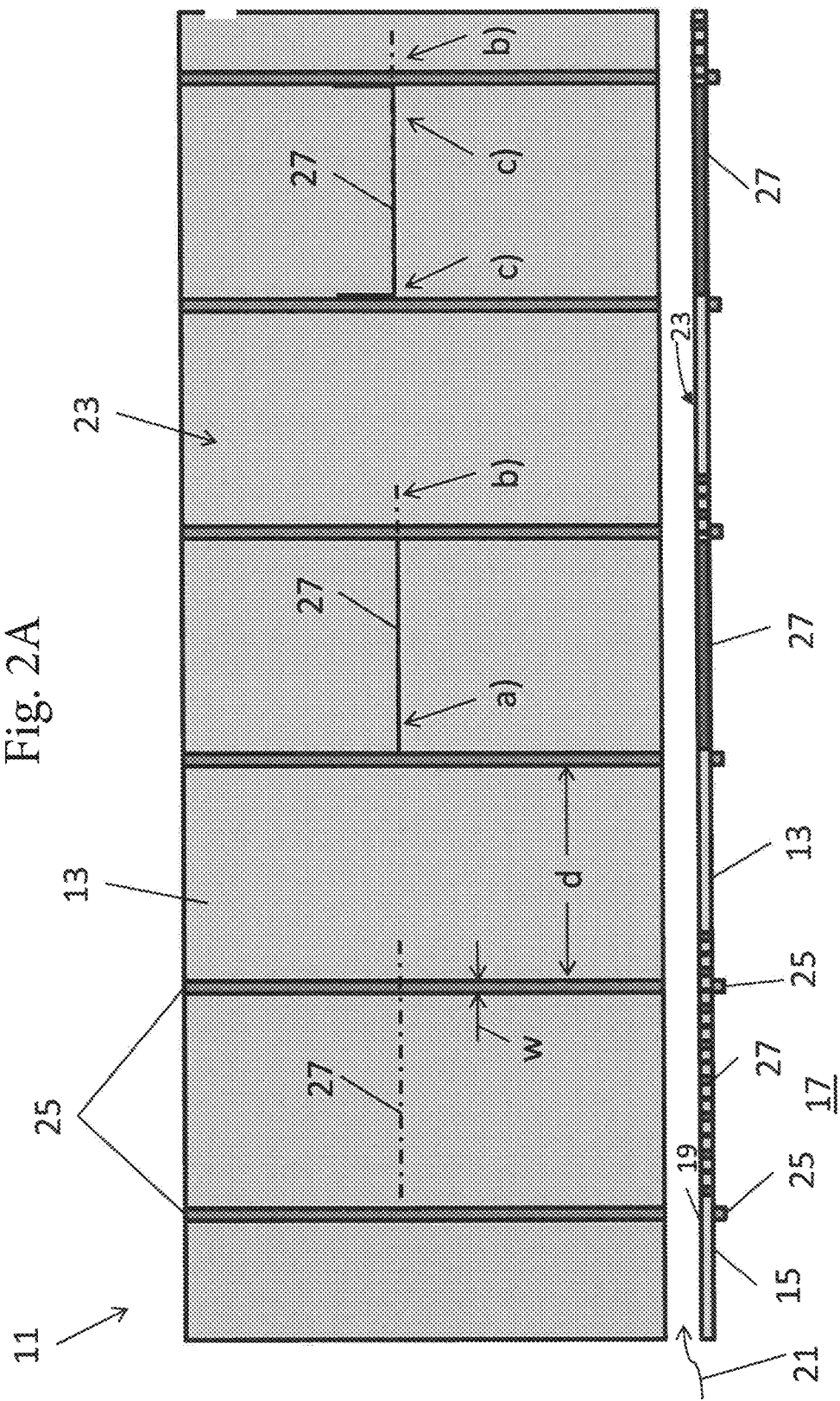

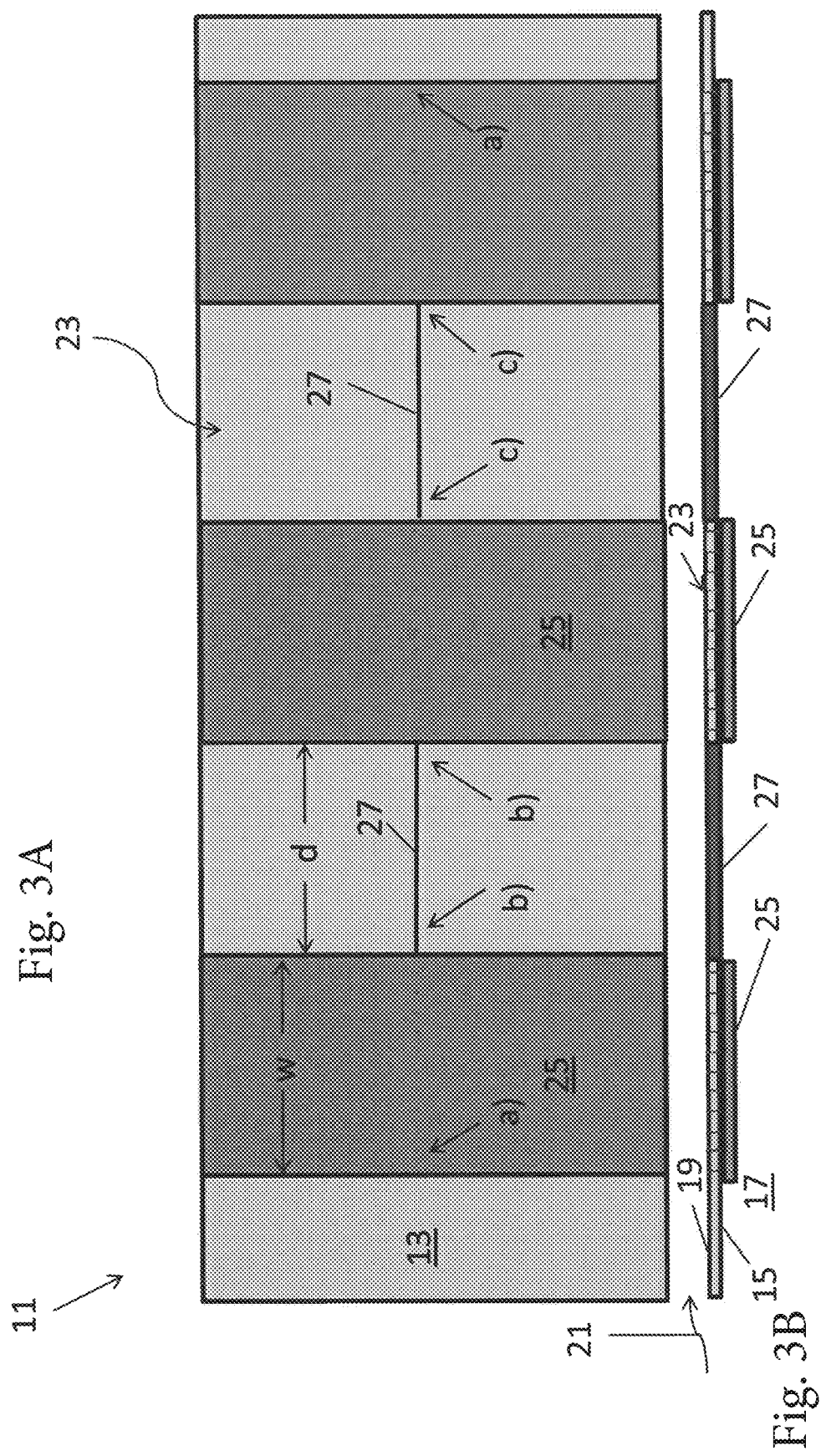

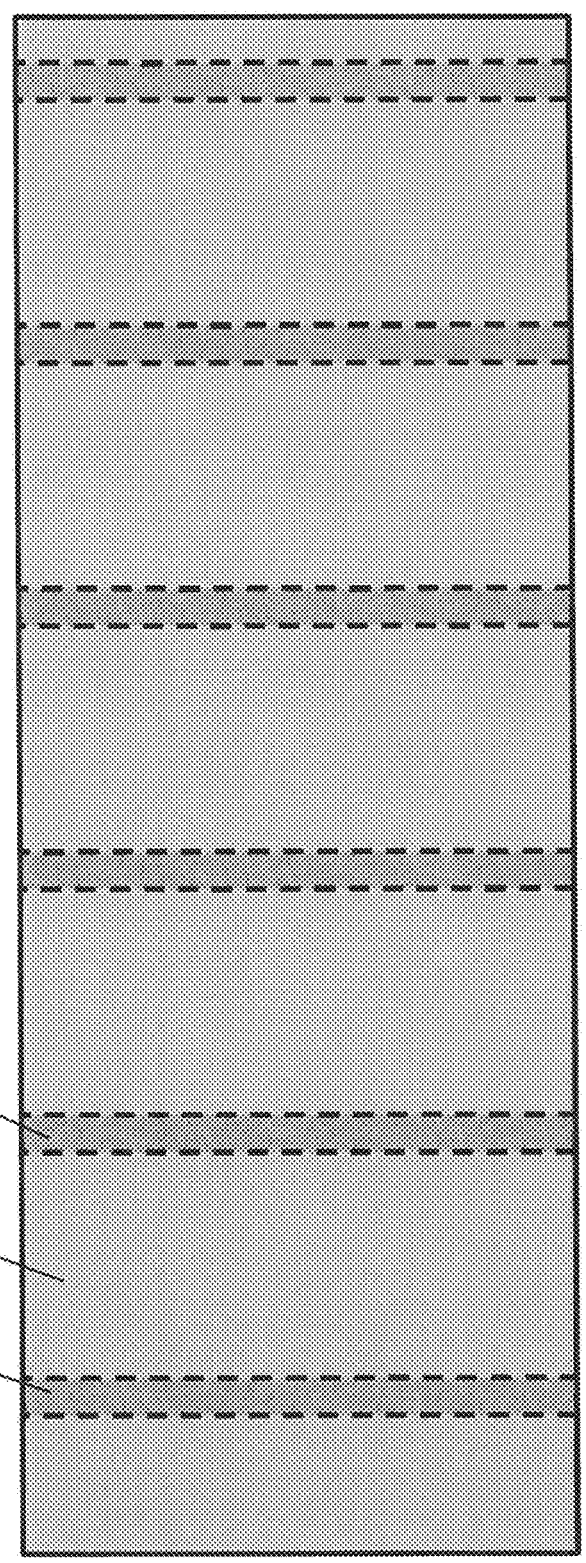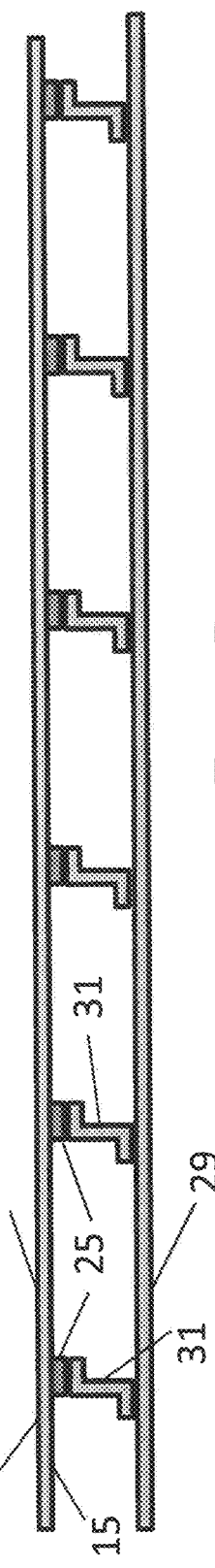

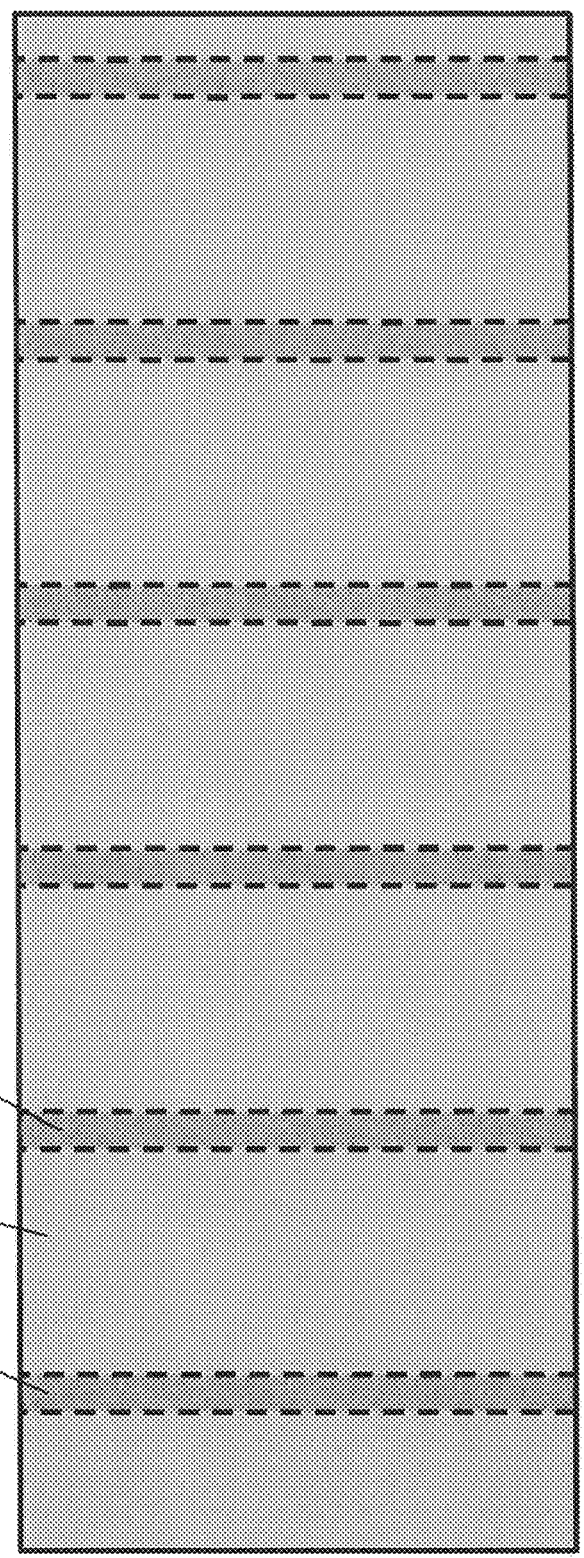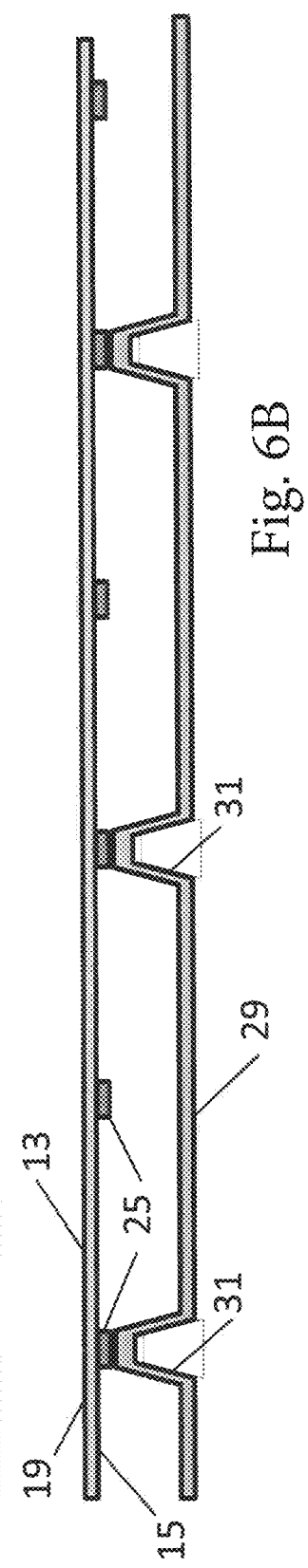

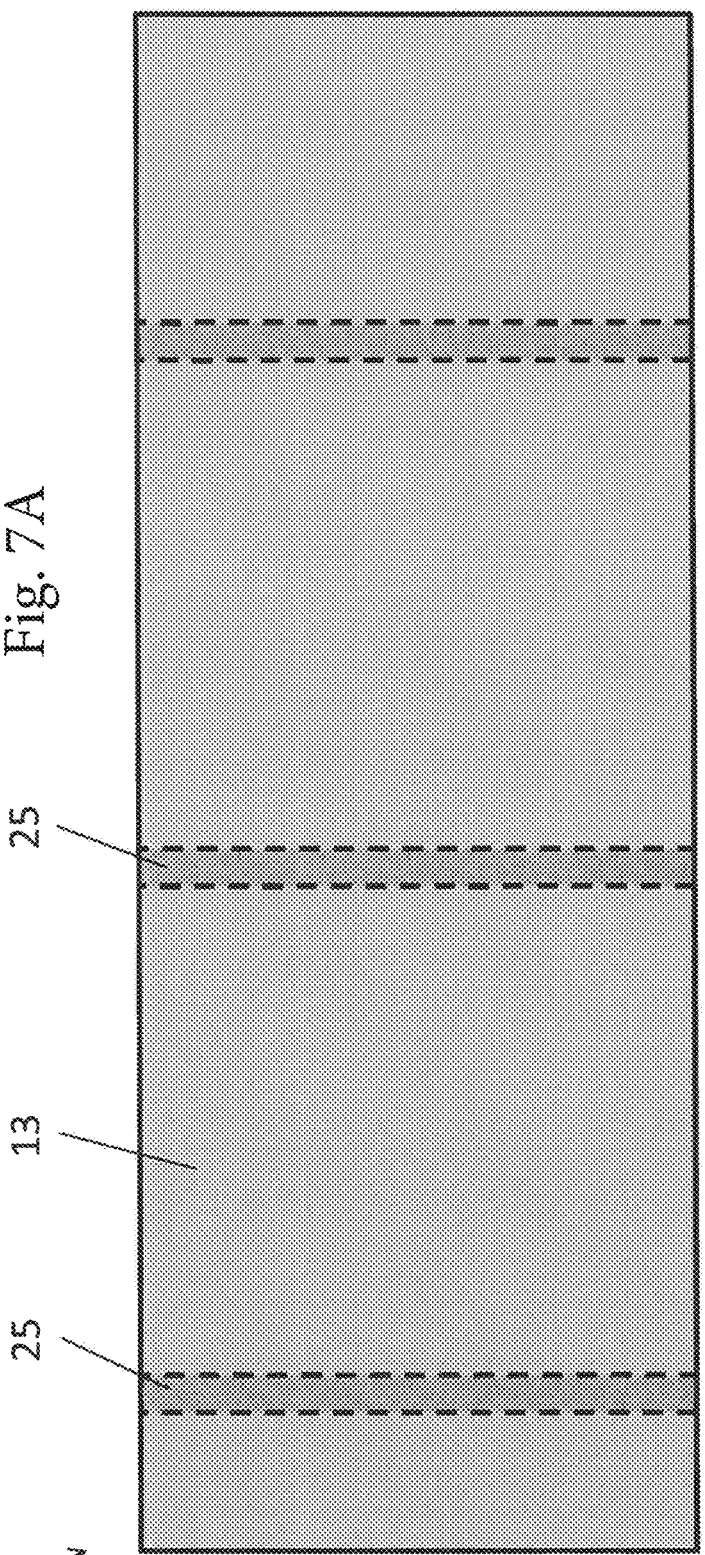
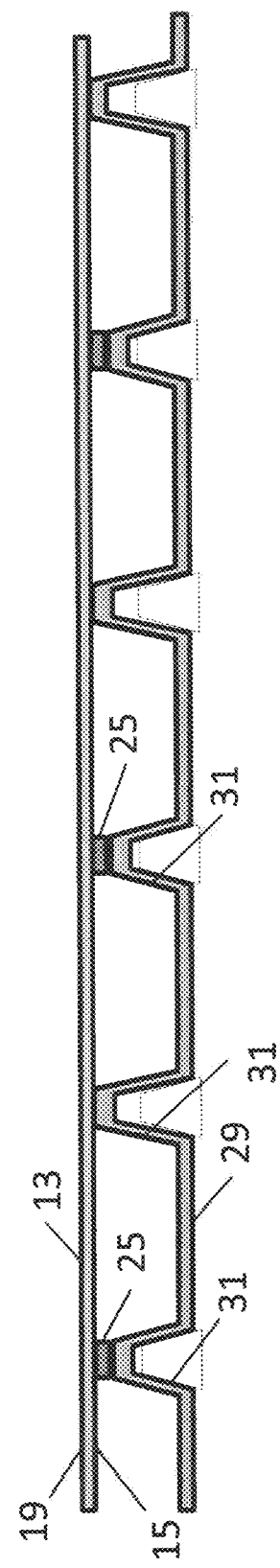
Fig. 7A
Fig. 7B

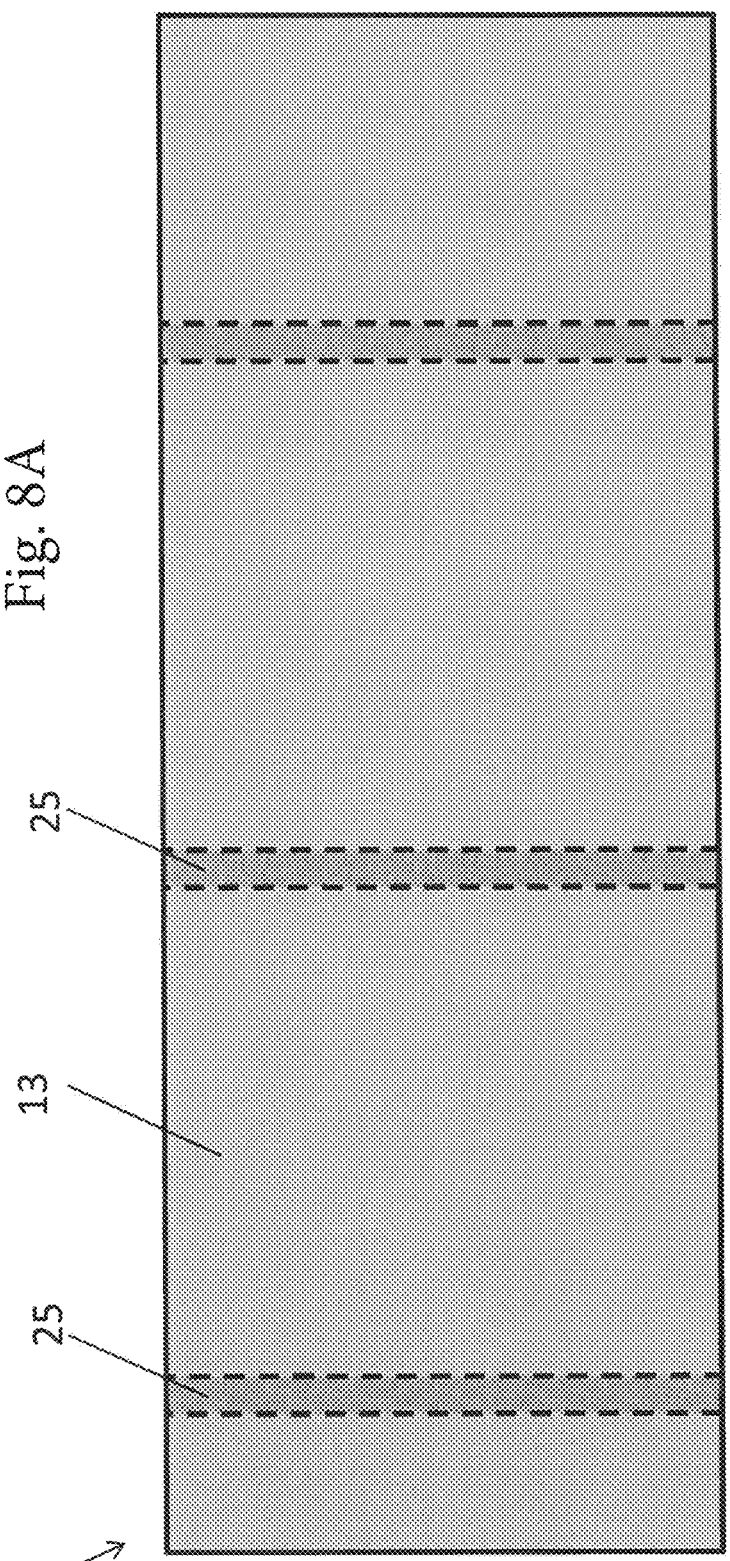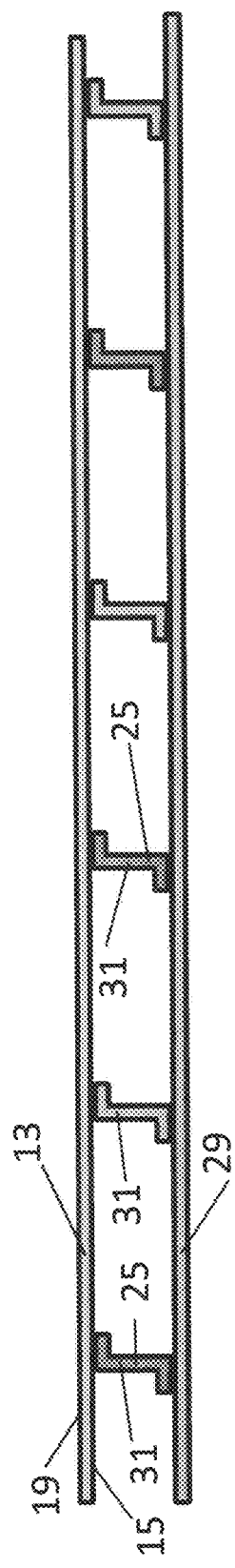

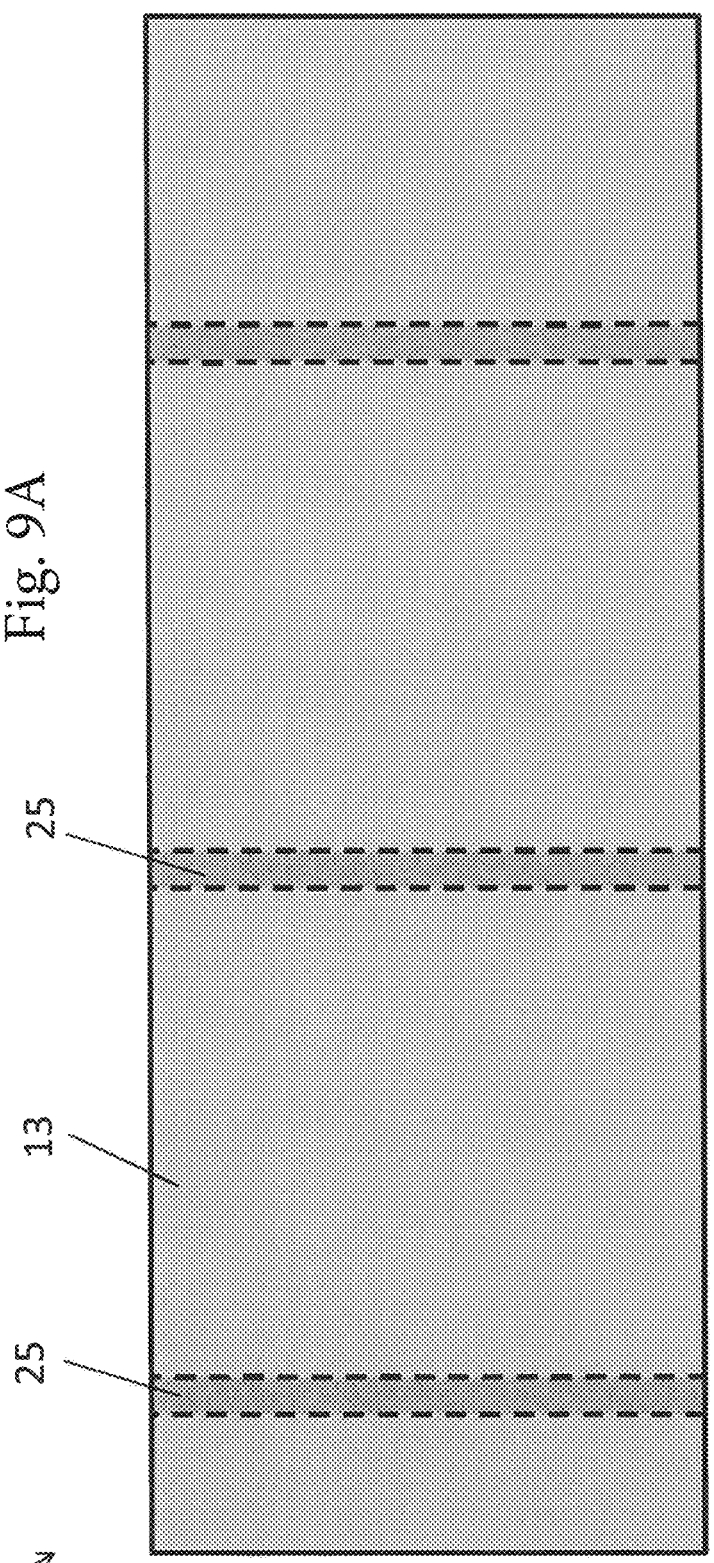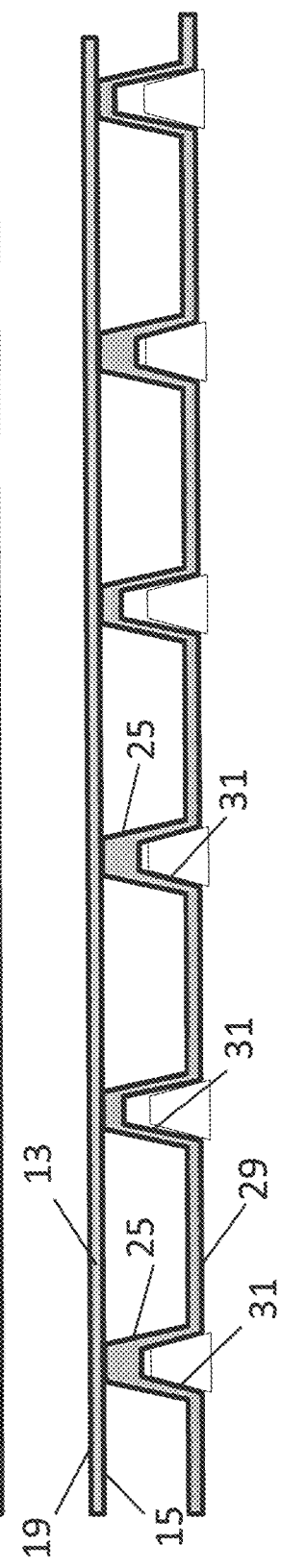

AIRCRAFT STRUCTURE FOR FLOW CONTROL

RELATED APPLICATION

This application claims priority to German patent application 10 2019 105 166.5 filed Feb. 28, 2019, the entirety of which is incorporated by reference.

BACKGROUND

The present invention relates to an aircraft structure configured for flow control, such as configured for hybrid laminar flow control (HLFC). A further aspect of the invention relates to an aircraft comprising such an aircraft structure.

The aircraft structure comprises a perforated panel having an inner surface directed to a structure interior, an outer surface in contact with an ambient flow, and a plurality of micro pores distributed over the perforated panel and connecting the inner and outer surfaces. The perforated panel may be formed of a metal material, such as titanium.

Such aircraft structures are known in connection with hybrid laminar-flow control (HLFC) systems where air is sucked in or blown out through the micro pores in the perforated panel to advantageously influence the ambient flow along the aircraft structure to increase lift and reduce drag, and as a consequence reduce fuel consumption. The micro pores necessary for sucking in or blowing out air, however, decreases the fatigue strength of the perforated panel as crack initiation and propagation through the perforated panel is simplified by the micro pores. Thus, a higher panel thickness is required to obtain the required fatigue strength, which however adds to the weight of the aircraft structure.

Accordingly, there is a need to reduce the weight of the aircraft structure while maintaining the required fatigue strength.

SUMMARY OF INVENTION

To reduce the weight of the aircraft structure and to maintain fatigue strength, one or more elongate crack stopper elements are attached to the inner surface of the perforated panel. A plurality of crack stopper elements may be provided that extend in parallel to one another. The crack stopper elements may be bonded to the inner surface of the perforated panel, but might also be bolted or riveted thereto. The crack stopper elements are configured to inhibit crack propagation within the perforated panel past the crack stopper element, i.e. from one side of a crack stopper element to the other side. Inhibiting crack propagation means either to stop or at least to decelerate crack propagation. It might also mean that crack propagation is deflected in an uncritical direction in parallel to the crack stopper elements.

By such crack stopper elements crack propagation, specifically with respect to a direction transverse the crack stopper elements, can be stopped or at least decelerated, so that the fatigue strength of the perforated panel and thus of the aircraft structure is increased. In other words, the thickness of the perforated panel can be reduced without reducing the fatigue strength of the perforated panel at the same time, which in turn leads to a weight reduction of the aircraft structure, and consequently to a reduced fuel consumption of the related aircraft.

According to an embodiment, the crack stopper elements extend, longitudinally, in a direction transverse to a direction of flight of an associated aircraft. The crack stopper elements may extend within an angle range, for example, of 0° to 45°, 0° to 30°, or 0° to 15° relative to the main load direction, such as in the span direction. In such a way, the crack stopper elements also extend transversely, e.g., perpendicularly, to the expected direction of crack propagation.

According to another embodiment, the crack stopper elements have considerably higher fatigue strength than the perforated panel, in particular than the related adjacent parts of the perforated panel, specifically with respect to loads applied in the longitudinal direction of the crack stopper elements. In such a way, cracks propagating in the perforated panel towards crack stopper elements will be stopped, deflected in a direction parallel to the crack stopper elements, or at least decelerated due to the higher fatigue strength of the crack stopper elements.

According to yet another embodiment, the crack stopper elements are formed as strips of fiber reinforced plastic (FRP) material. In case of the perforated panel made of a metal material a local fiber metal laminate (FML) is thereby formed by the FRP strips together with the perforated panel in the area of the strips. The volume ratio of metal and FRP might be, e.g. 1/1 or similar. Such FML due to its high crack growth resistance is specifically suitable for crack stopping.

According to a further embodiment, the crack stopper elements have a width, perpendicular to the longitudinal extension and along the inner surface of the perforated panel, ranging, for example, from $1/100$ to $1/1$, $1/25$ to $1/15$, or $1/20$, of the distance between each two adjacent crack stopper elements. A lower width of the crack stopper elements might be advantageous as less micro pores are covered by the crack stopper elements, while a higher width might provide more efficient crack stopping. Thus, the width is ideally adapted depending on the requirements of the specific application.

According to a further embodiment, the micro pores in the perforated panel extend also through the crack stopper elements. In such a way, the micro pores are not covered by the crack stopper elements and air might be sucked in and blown out through the micro pores in a homogeneous way. This is specifically advantageous in the case of crack stopper elements having a higher width, where consequently a higher number of micro pores would be covered. However, non-perforated crack stopper elements may be suited and provide simplicity of production and higher strength as compared to perforated crack stopper elements, specifically in the case of lower width crack stopper elements where only few micro pores are covered.

In another embodiment, the aircraft structure further comprises an inner panel mounted to the perforated panel via stiffeners that are attached to the inner surface of the perforated panel, e.g. by bonding. The inner panel and the stiffeners may be made of a FRP material. The stiffeners might be part of the inner panel or might be separate parts attached to the outer side of the inner panel, e.g. by co-curing, molding, or bonding. For example, the stiffeners might have Z-profiles mounted to both the inner panel and the perforated panel, or might have Ω-profiles or trapezoid-shaped profiles that are integral with or mounted to the inner panel and mounted to the perforated panel. By adding such an inner panel a double-walled, stiffener reinforced aircraft structure is formed, which is specifically advantageous for use in flow control systems as the outer perforated panel is additionally supported.

In particular, at least some of the crack stopper elements may be provided between the inner surface of the perforated panel and at least some of the stiffeners. For example, crack stopper elements might be provided at each stiffener or might be provided only at some of the stiffeners, e.g. at every other stiffener. Additionally, crack stopper elements might be attached to the inner surface of the perforated panel at locations between the stiffeners, e.g. centrally between each two adjacent stiffeners. In such a way, the stiffeners can be used to fix the crack stopper elements to the perforated panel and no additional bonding or fixation needs to be applied for the related crack stopper elements.

Additionally or advantageously, at least some of the stiffeners may be formed as crack stopper elements. In such a way, no or less separate crack stopper elements need to be provided and fixed to the perforated panel.

In particular, the stiffeners may be formed as crack stopper elements by the material of the stiffeners being configured for crack stopping. Specifically, the material of the stiffeners is selected such that the stiffeners have higher fatigue strength than the perforated panel, in particular than the portion of the perforated panel to which the respective stiffeners are attached. In such a way, crack stopping is provided only by respectively adjusting the material of the corresponding stiffeners, which are provided, anyway. Separate crack stopper elements can be saved.

Additionally or alternatively, the stiffeners may be formed as crack stopper elements by the shape, in particular the profile, of the stiffener being configured for crack stopping. Specifically, the shape of the stiffeners is selected such that the stiffeners have higher fatigue strength than the perforated panel, in particular than the portion of the perforated panel to which the respective stiffeners are attached. In such a way, crack stopping is provided only by respectively adjusting the shape of the corresponding stiffeners, which are provided, anyway. Separate crack stopper elements can be saved.

In particular, the stiffeners may have an increased thickness at least at the portion attached to the inner surface of the perforated panel. Such an increased thickness of the stiffeners provides increased fatigue strength that serves to stop or at least decelerate crack propagation within the perforated panel.

A further aspect of the present invention relates to an aircraft. The aircraft comprises a fuselage, wings, a vertical tail plane, and a horizontal tail plane. The aircraft structure according to any of the embodiments described above is arranged at the wings and/or at the vertical tail plane and/or at the horizontal tail plane of the aircraft. The features and advantages described above in connection with the aircraft structure apply vis-à-vis to the aircraft.

SUMMARY OF DRAWINGS

Embodiments of the present invention are illustrated in the drawings which are:

FIGS. 2A and 2B are schematic illustrations (top and cross sectional view) of an embodiment of an aircraft structure having crack stopper elements in the form of low width FRP strips, FIGS. 3A and 3B are schematic illustrations (top and cross sectional view) of an embodiment of an aircraft structure having crack stopper elements in the form of high width FRP strips, FIGS. 5A and 5B are schematic illustrations (top and cross sectional view) of an embodiment of an aircraft structure having crack stopper elements arranged between Z-stiffeners and the perforated panel, FIGS. 6A and 6B are schematic illustrations (top and cross sectional view) of an embodiment of an aircraft structure having crack stopper elements arranged in connection with the stiffeners and in addition between each two adjacent stiffeners, FIGS. 7A and 7B are schematic illustration (top and cross sectional view) of an embodiment of an aircraft structure having crack stopper elements arranged in connection with every other stiffener, FIGS. 8A and 8B are schematic illustrations (top and cross sectional view) of an embodiment of an aircraft structure having crack stopper elements in the form of stiffeners, wherein every other stiffener has a specific material adapted for crack stopping, FIGS. 9A and 9B are schematic illustrations (top and cross sectional view) of an embodiment of an aircraft structure having crack stopper elements in the form of stiffeners, wherein every other stiffener has a thickened shape adapted for crack stopping.

DETAILED DESCRIPTION

Figure 1:
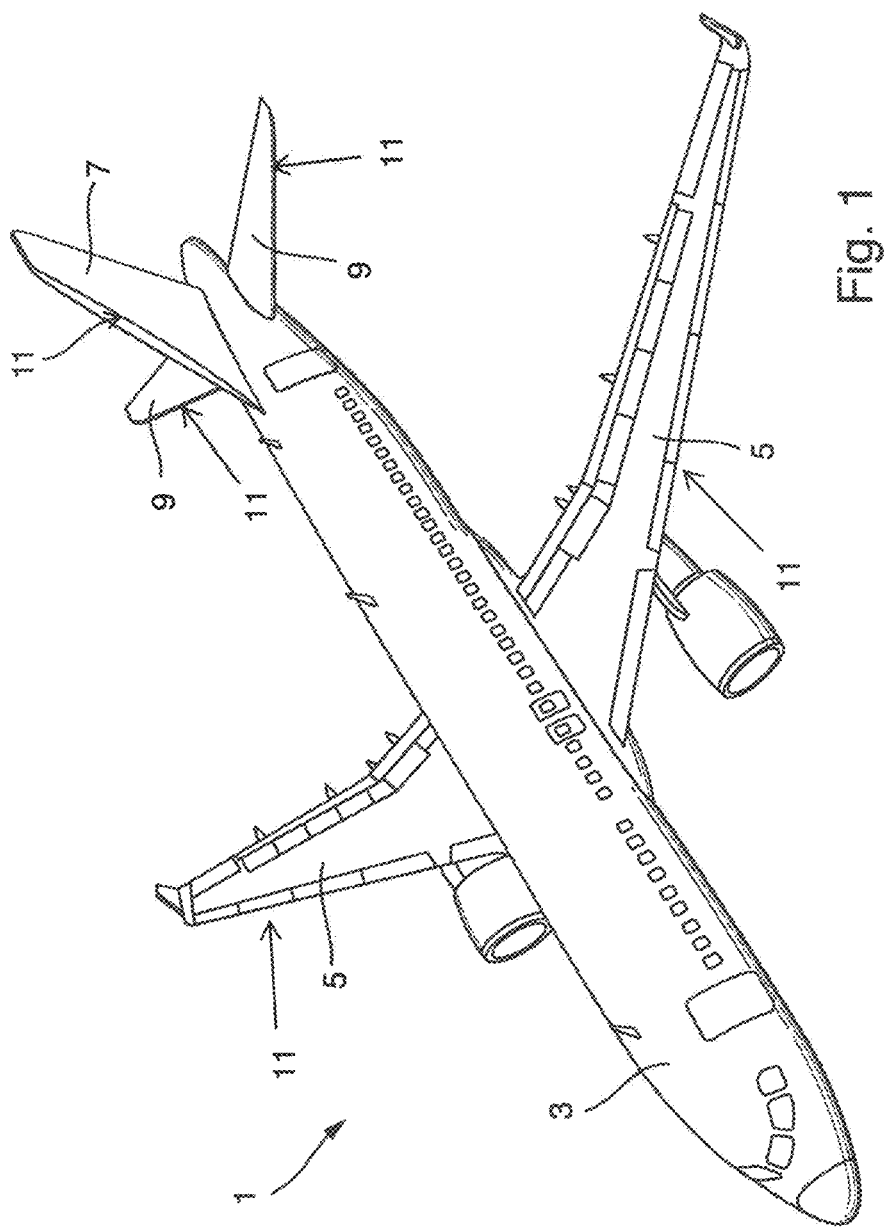
FIG. 1 is a perspective view of an aircraft according to the invention.
Figure 4A:
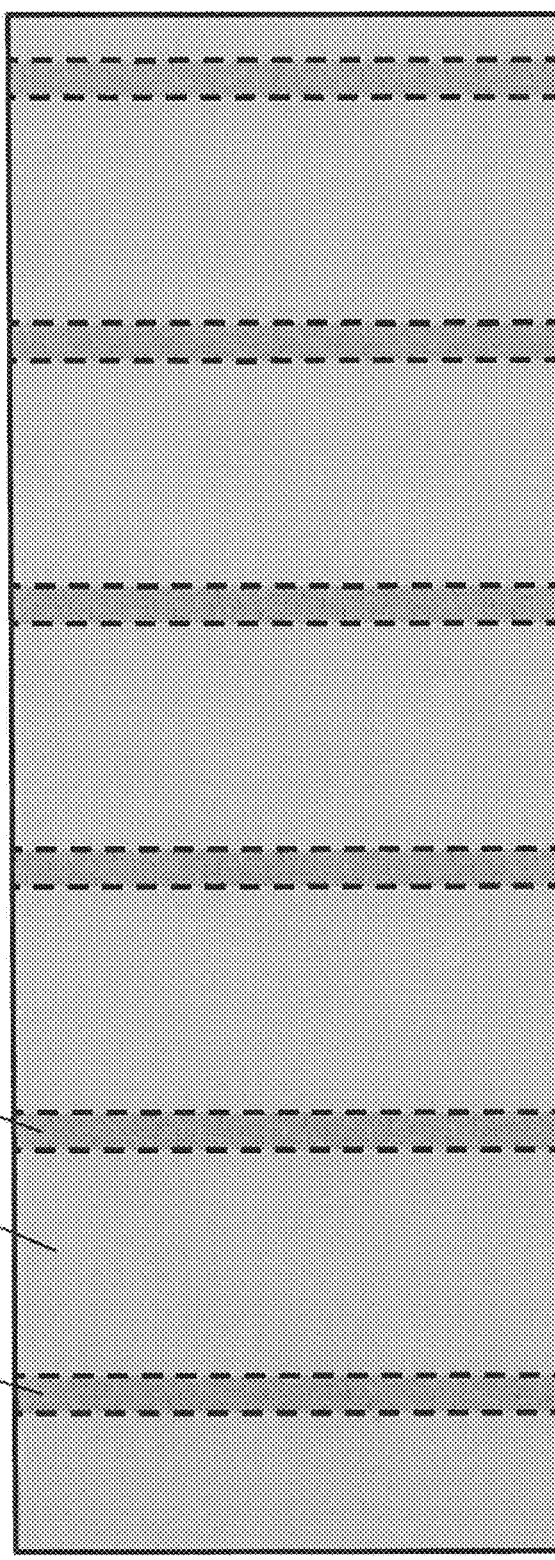
FIGS. 4A and 4B are schematic illustrations (top and cross sectional view) of an embodiment of an aircraft structure having crack stopper elements arranged between Ω-stiffeners and the perforated panel.
Figure 4B:
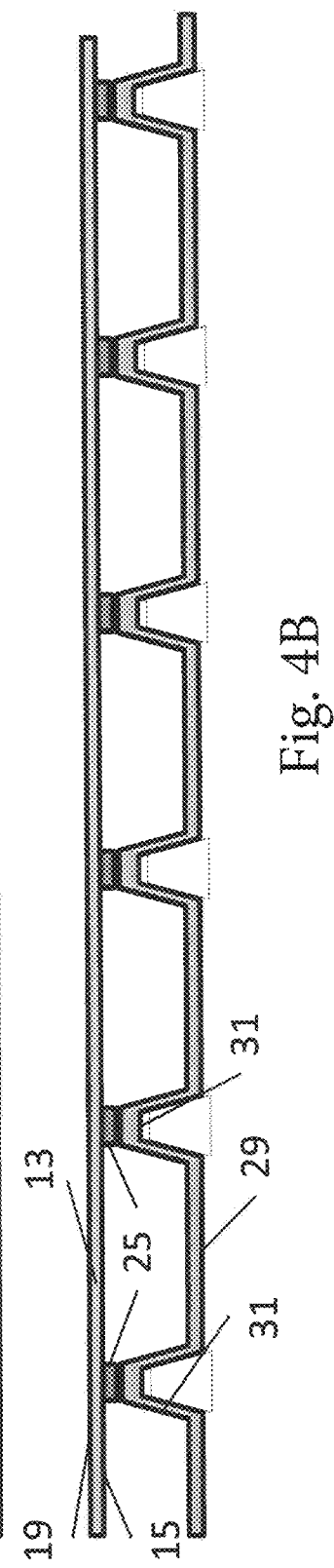

In FIG. 1 shows an aircraft 1 comprising a fuselage 3, wings 5, a vertical tail plane 7, and a horizontal tail plane 9. At the wings 3, at the vertical tail plane 7, and at the horizontal tail plane 9 the aircraft 1 comprises an aircraft structure 11 according to any of the embodiments described hereinafter.

In FIGS. 2A and 2B a first embodiment of the aircraft structure 11 according to the invention is shown. The aircraft structure 11 comprises a perforated panel 13 having an inner surface 15 directed to a structure interior 17, an outer surface 19 in contact with an ambient flow 21, and a plurality of micro pores 23 distributed over the perforated panel 13 and connecting the inner and outer surfaces 15, 19. The perforated panel 13 is formed of titanium material. A plurality of elongate crack stopper elements 25 are attached to the inner surface 15 of the perforated panel 13 in parallel to one another. The crack stopper elements 25 are configured to inhibit crack propagation within the perforated panel 11 past the crack stopper elements 25.

The crack stopper elements 25 extend, longitudinally, in a main load direction corresponding to the span direction of the aircraft structure 11. Further, the crack stopper elements 25 are formed as strips of fiber reinforced plastic (FRP) material having considerably higher fatigue strength than the related adjacent parts of the perforated panel 13, thereby forming a local fiber metal laminate (FML) together with the perforated panel 13 in the area of the strips. The width w of the crack stopper elements 25 of the embodiment shown in FIGS. 2A and 2B is about $\frac{1}{25}$ of the distance d between each two adjacent crack stopper elements 25.

The embodiment shown in FIGS. 3A and 3B differs from the embodiment of FIGS. 2A and 2B by the width w of the crack stopper elements 25 being about $\frac{1}{10}$ of the distance d between each two adjacent crack stopper elements 25. Further, due to the high width w of the crack stopper elements 25 the micro pores 23 in the perforated panel 13 extend also through the crack stopper elements 25, so that the micro pores 23 are not blocked by the crack stopper elements 25.

In FIGS. 2A and 2B, and FIGS. 3A and 3B, it is indicated how the crack stopper elements 25 inhibit crack propagation by: a) stopping the crack 27, b) decelerating propagation of the crack 27, and c) deflect propagation of the crack 27 to an uncritical direction in parallel to the crack stopper elements 25.

In FIGS. 4A and 4B to 9A and 9B various embodiments of the aircraft structure 11 are shown where the aircraft structure 11 further comprises an inner panel 29 mounted to the perforated panel 13 via stiffeners 31 that are attached to the inner surface 15 of the perforated panel 13. The inner panel 29 and the stiffeners 31 are made of FRP material. In the embodiments of FIGS. 4A and 4B, 6A and 6B, 7A and 7B, and 9A and 9B, the stiffeners 31 have Ω-profiles integral with the inner panel 29 and attached to the perforated panel 13. In the embodiments of FIGS. 5A and 5B and 8A and 8B the stiffeners 31 have Z-profiles attached to both the inner panel 29 and the perforated panel 13. At least some of the crack stopper elements 25 are provided between the inner surface 15 of the perforated panel 13 and at least some of the stiffeners 31.

In the embodiments shown in FIGS. 4A and 4B, to 6A and 6B, crack stopper elements 25 in the form of FRP strips are provided between each stiffener 31 and the perforated panel 13. In the embodiment shown in FIGS. 6A and 6B, crack stopper elements 25 are additionally attached to the inner surface 15 of the perforated panel 13 at locations centrally between each two adjacent stiffeners 31. In the embodiment shown in FIGS. 7A and 7B, the crack stopper elements 25 are also in the form of FRP strips but are provided only at every other stiffener 31.

In the embodiments shown in FIGS. 8A and 8B and FIGS. 9A and 9B, instead of being in the form of FRP strips, the crack stopper elements 25 are formed by the stiffeners 31 themselves. Specifically, at least some of the stiffeners 31 are formed as crack stopper elements 25. In the embodiment of FIGS. 8A and 8B, the stiffeners 31 are formed as crack stopper elements 25 by the material of the stiffeners 31 being configured for crack stopping, i.e. the material of the stiffeners 31 is selected such that the stiffeners 31 have higher fatigue strength than the perforated panel 13.

In the embodiment of FIGS. 9A and 9B, the stiffeners 31 are formed as crack stopper elements 25 by the shape of the stiffeners 25 being configured for crack stopping, i.e. the shape of the stiffeners 31 is selected such that the stiffeners 31 have higher fatigue strength than the perforated panel 13. This is done by providing the stiffeners 31 with an increased thickness at the head portion 33 attached to the inner surface 15 of the perforated panel 13.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. An aircraft structure configured for hybrid laminar flow control comprising a perforated panel having an inner surface adjacent a chamber of a structure interior, an outer surface configured to be in contact with an ambient flow over the aircraft structure, and a plurality of micro pores extending from the inner surface to the outer surface, and elongate crack stopper strips attached to the inner surface of the perforated panel and extending in a spanwise direction of the aircraft structure, wherein the elongate crack stopper strips are configured to inhibit crack propagation within the perforated panel, wherein air flows through the micro-pores between the ambient flow and the chamber to influence the ambient flow over the outer surface to increase aerodynamic lift or reduce aerodynamic drag of the aircraft structure, wherein the chamber spans at least two of the elongate crack stopper strips, and wherein the micro-pores are in fluid communication with the chamber throughout an area of the perforated panel spanning the at least two of the elongate crack stopper strips, and wherein a plurality of the crack stopper strips include micro pores aligned with the micro pores of the perforated skin panel.

2. The aircraft structure according to claim 1, wherein the elongate crack stopper strips extend in a main load direction of the aircraft structure.

3. The aircraft structure according to claim 1, wherein a material forming the elongate crack stopper strips has a fatigue strength higher than a material forming the perforated panel.

4. The aircraft structure according to claim 1, wherein the elongate crack stopper strips are each formed of fiber reinforced plastic (FRP) material.

5. The aircraft structure according to claim 1, wherein the elongate crack stopper strips include two adjacent crack stopper strips and each of the two adjacent crack stopper strips has a width (w) in a range of 1/100 to 1/1 of a distance (d) between the two adjacent crack stopper strips.

6. The aircraft structure according to claim 1, wherein the micro pores in the perforated panel span at least six elongate crack stopper strips.

7. The aircraft structure according to claim 1, further comprising an inner panel mounted to the perforated panel via stiffeners that are attached to the inner surface of the perforated panel.

8. The aircraft structure according to claim 7, wherein a plurality of the elongate crack stopper strips are between the inner surface of the perforated panel and at least some of the stiffeners.

9. The aircraft structure according to claim 7, wherein at least some of the stiffeners are configured as crack stopper strips included in the elongate crack stopper strips.

10. The aircraft structure according to claim 9, wherein the stiffeners configured as the crack stopper strips are formed of a material having a fatigue strength higher than a material forming the perforated panel.

11. The aircraft structure according to claim 9, wherein each of the stiffeners one of the crack stopper strips.

12. The aircraft structure according to claim 11, wherein the stiffeners have an increased thickness at least at a head portion attached to the inner surface of the perforated panel, wherein the increased thickness is a region of the stiffeners having a greater thickness than a region of the stiffeners away from the surface of the perforated panel.

13. An aircraft comprising a fuselage, wings, a vertical tail plane and a horizontal tail plane, wherein the aircraft structure according to claim 1, is arranged at the wings and/or at the vertical tail plane and/or at the horizontal tail plane.

14. An aerodynamic structure on an aircraft comprising:
a perforated skin panel included an outer surface configured to be in contact with an ambient airflow, inner surface opposite to the outer surface and facing a chamber within the aerodynamic structure, and micro pores extending through the perforated skin panel and connecting the inner and outer surfaces,
stiffeners extending in a spanwise direction,
crack stopper strips bonded to the inner surface of the perforated skin panel such that the crack stopper strips overlap at least some of the micro pores,
wherein the crack stopper strips extend in the spanwise direction of the aerodynamic structure;
wherein at least one of the crack stopper strips is between one of the stiffeners and the perforated skin panel,
wherein at least one of the crack stopper strips is offset from the stiffeners in a chordwise direction perpendicular to the spanwise direction;
wherein the chamber spans at least two of the crack stopper strips;
wherein the micro-pores are in fluid communication with the chamber throughout an area of the perforated panel spanning the at least two of the elongate crack stopper strips;
wherein a plurality of the crack stopper strips are oriented in a spanwise direction of the aerodynamic structure and the crack stopper strips each have a width narrower than a gap between adjacent ones of the crack stopper strips, and
wherein the aerodynamic structure is configured for hybrid laminar flow control and the micro pores in the perforated skin panel are configured allow air to flow between the ambient airflow and the chamber to influence the ambient airflow over the outer surface to increase aerodynamic lift or reduce aerodynamic drag of the aerodynamic structure.

15. The aerodynamic structure of claim 14, wherein the perforated skin panel is metallic or a fiber metal laminate, and the crack stopper strips are a fiber reinforced plastic material.

16. The aerodynamic structure of claim 14, wherein a plurality of the crack stopper strips are sandwiched between the stiffeners and the perforated skin panel.

17. The aerodynamic structure of claim 14, further comprising stiffeners extending in the spanwise direction, and at least one of the crack stopper strips is integral and a single piece component with one of the stiffeners.

* * * * *